United States Patent [19]

Takahashi

[11] Patent Number: 4,717,245
[45] Date of Patent: Jan. 5, 1988

[54] HIGH RELATIVE APERTURE GAUSS TYPE LENS

[75] Inventor: Sadatoshi Takahashi, Tokyo, Japan

[73] Assignee: Canon Kabushiki Kaisha, Tokyo, Japan

[21] Appl. No.: 938,445

[22] Filed: Dec. 5, 1986

[30] Foreign Application Priority Data

Dec. 12, 1985 [JP] Japan .................. 60-280060

[51] Int. Cl.$^4$ .................. G02B 9/00; G02B 11/34
[52] U.S. Cl. .................. 350/463; 350/432
[58] Field of Search .................. 350/463, 464, 465

[56] References Cited

FOREIGN PATENT DOCUMENTS 1294059 4/1968 Fed. Rep. of Germany ...... 350/463

*Primary Examiner*—John K. Corbin
*Assistant Examiner*—Yong K. Choi
*Attorney, Agent, or Firm*—Fitzpatrick, Cella, Harper & Scinto

[57] ABSTRACT

A high relative aperture Gauss type lens comprising, from front to rear, a first lens unit including at least one positive lens, a negative meniscus-shaped second lens convex toward the front, a positive third lens with its front surface of strong convex curvature toward the front, a negative fourth lens with its rear surface of strong concave curvature toward the rear, a negative fifth lens with its front surface of strong concave curvature toward the front, a positive sixth lens with its rear surface of strong convex curvature toward the rear, a negative meniscus-shaped seventh lens convex toward the rear, a positive meniscus-shaped eighth lens convex toward the rear, a positive ninth lens, and a positive meniscus-shaped tenth lens convex toward the front.

10 Claims, 6 Drawing Figures

HIGH RELATIVE APERTURE GAUSS TYPE LENS

BACKGROUND OF THE INVENTION

1. Field of the Invention:

This invention relates to high relative aperture Gauss type lenses of standard field angle suited to photographic cameras, video cameras, or still video cameras, and more particularly to Gauss type lenses of greatly increased relative aperture to as high as 1:1.0 in F-number with the maintenance of the regular back focal distance at an angular field of about 45°, while nevertheless permitting good aberration correction to be achieved for high grade imagery.

2. Description of the Related Art

In the single lens reflex type of photographic camera or video camera, there is a quick-return mirror in the rear of the objective so that light from the objective is reflected to the finder system. As design objectives for the single lens reflex camera, therefore, the required type should meet the condition that it is easy both to obtain a back focal distance as to arrange the quick-return type mirror therein and to insure that high grade optical performance is obtained.

In the past, the photographic lenses of standard field angle that fulfill these requirements relatively easily have been of the so-called Gauss type. At present, this type is most often used.

To increase the speed of aperture beyond 1:1.2 in F-number with the maintenance of the regular back focal distance, however, the employment of the conventional rules of design for the Gauss type lenses will result in rapid increase of various aberrations. Particularly the off-axis halo and curvature of field are largely affected. It will, therefore, become very difficult to well correct these aberrations.

A faster Gauss type lens than 1:1.2 has been proposed in, for example, Japanese Patent Publication No. SHO 39-10178. But, because its back focal distance is as short as 0.4 times the focal length, this lens is not usable in most of the photographic cameras or in the single lens reflex cameras.

Summary of the Invention

The present invention has, therefore, for its general object to provide a photographic lens of high relative aperture and long back focal length.

Another object is to provide a Gauss type lens of standard or semi-standard field angle with high relative perture.

In an embodiment of the invention, the relative aperture is increased to as high as 1:1.0 in F-number, and the back focal distance is increased to at least 0.7 times the focal length, while nevertheless permitting good correction of aberrations to be achieved for high grade imagery over the entire area of the picture format.

These and other objects and features of the invention will become apparent from the following detailed description of preferred embodiments thereof by reference to the accompanying drawings.

DETAILED DESCRIPTION OF THE PREFERRED EMBODIMENTS

Figure 1:
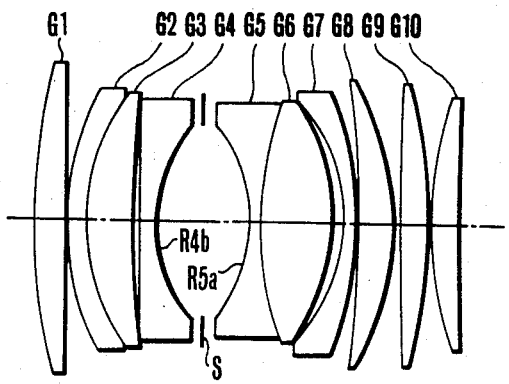
FIGS. 1 to 3 are longitudinal section views of three examples of specific lenses of the invention, respectively.
Figure 2:
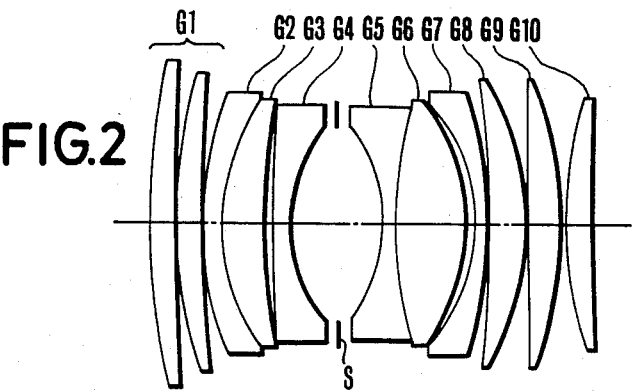
Figure 3:
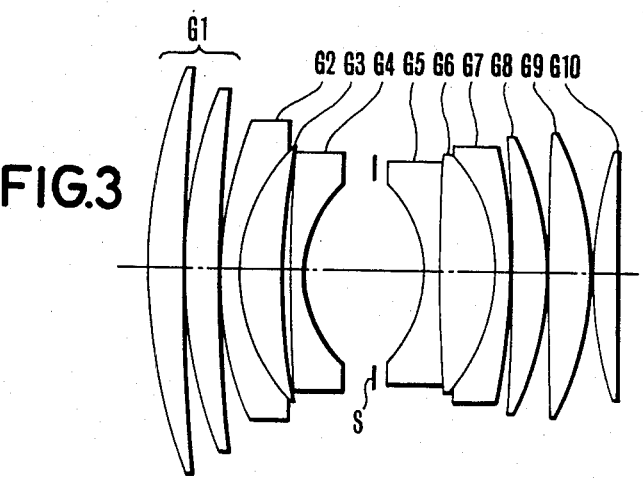
Figure 4:
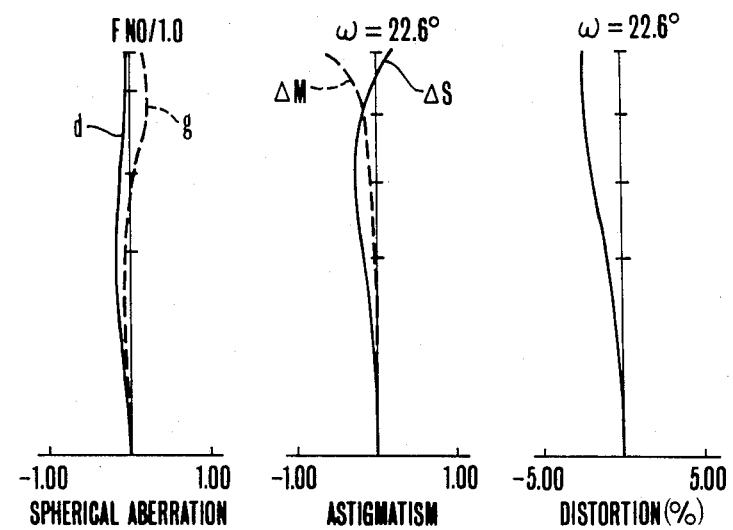
FIGS. 4 to 6 are graphic representations of the various aberrations of the lenses of FIGS. 1 to 3.
Figure 4:
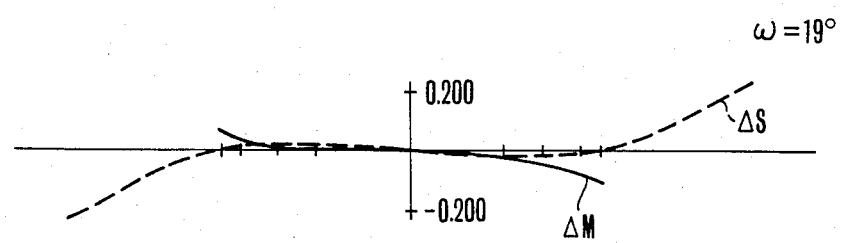
Figure 5:
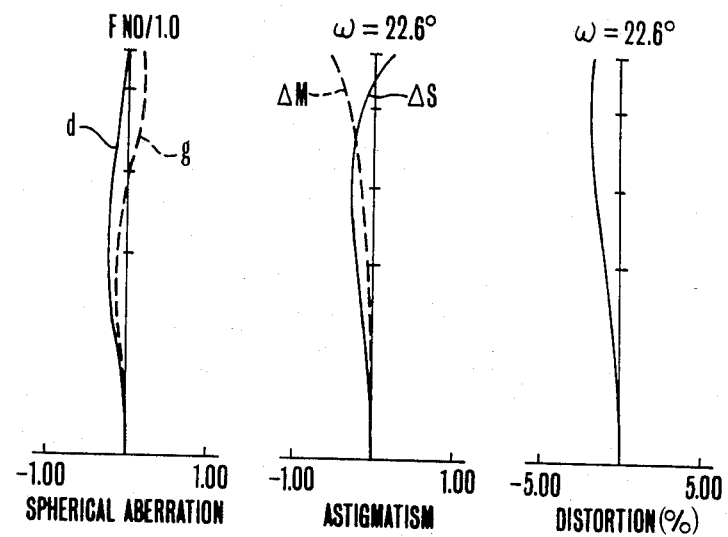
Figure 5:
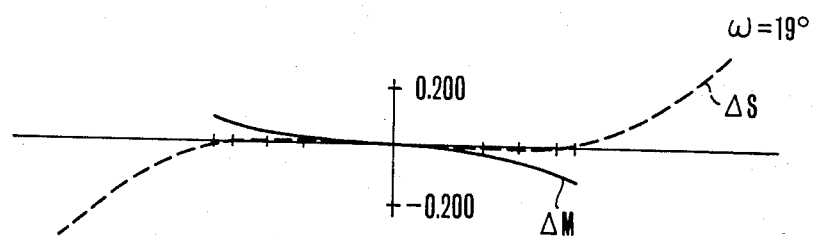
Figure 6:
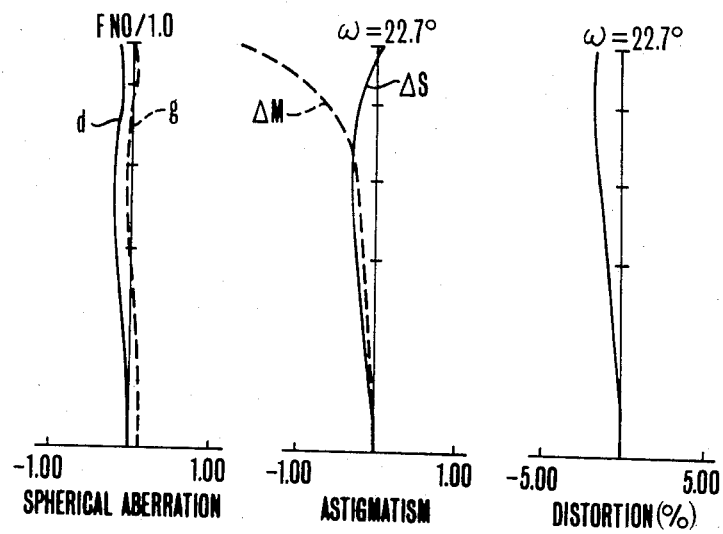
Figure 6:
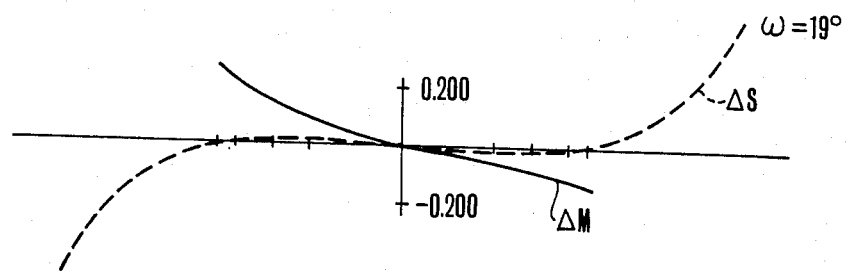

In FIGS. 1 to 3, Gi denotes the i-th lens unit or lens counting from the front, and S the stop. In the illustrated embodiment, the photographic lens comprises, from front to rear, a first lens unit G1 including at least one positive lens, a negative second lens G2 in the meniscus form of forward convexity, a positive third lens G3 with its front surface of strong curvature convex toward the front, a negative fourth lens G4 with its rear surface of strong curvature concave toward the rear, a negative fifth lens G5 with its front surface of strong curvature concave toward to front, a positive sixth lens G6 with its rear surface of strong curvature convex toward the rear, a negative seventh lens G7 in the meniscus form of rearward convexity, a positive eighth lens G8 in the meniscus form of rearward convexity, a positive ninth lens G9 and a positive tenth lens G10 in the meniscus form of forward convexity. The term "strong" herein as used means that the absolute value of power of one surface of the lens is larger than that of the other surface.

In general, the Gauss-type lens has its two negative lenses positioned on either side of a central stop and oriented with their concave surfaces of strong power toward the stop, and includes at least one positive lens in each of the front and rear sides of the combination of the two negative lenses. By relying mainly on those concave surfaces of negative power of the two negative lenses on either side of the stop which face at the stop, the regular back focal distance is secured, and the Petzval sum is minimized to achieve flatness of field curvature. Along with this, other aberrations such as coma are corrected.

However, an increase in the power of each of these two concave surfaces causes the sagittal flare to increase largely from the intermediate to the marginal zone of the picture format. This situation is very intensified particularly when the F-number is decreased, for example, beyond 1:1.2. In the conventional design of a Gauss type lens of decreased F-number, it was this increase of the sagittal flare that constituted the main problem.

In the embodiment of the invention, the required negative power for each of those concave surfaces of the two negative lenses G4 and G5 on either side of the stop S which face the stop S is made partly shared with the respective one of the additional two negative lenses or second and seventh lenses G2 and G7 of prescribed forms arranged on the front and rear sides of the fourth and fifth lenses G4 and G5, respectively.

As this allows the concave curvatures of the rear and front surfaces of the fourth and fifth lenses G4 and G5 respectively to be weakened, the sagittal flare is lessened and, at the same time, the chromatic sagittal flare particularly for the spectral g-line is lessened. Additionally, the increase of the Petzval sum resulting from the decrease of that negative power is compensated for by the second and seventh lenses G2 and G7. Particularly in this embodiment, the second lens G2 is made of a glass whose refractive index is not more than 1.65 with an advantage of preventing the Petzval sum from increasing so that the system is well corrected for curvature of field.

Another feature is that the negative second lens G2 is positioned at almost the center of a lens system on the object side of the stop S, and the negative seventh lens G7 is similarly positioned at almost the center of another lens system on the image side of the stop S with an advantage that the back focal distance is easily increased to the prescribed value while preventing the total length of the entire lens system from increasing.

In order to correct spherical aberration and astigmatism along with the other aberration in good balance at an F-number of 1:1 or thereabout, use is made of at least one positive lens G1 arranged on the object side of the second lens G2 and three positive lenses of prescribed forms on the image side of the seventh lens G7.

When the above-stated features are fulfilled, a high relative aperture Gauss type lens that the present invention aims for is realized. To achieve a further improvement of the correction of various aberrations over the entire area of the image format, it is preferred to give the following conditions:

$$0.44 < R4b/f < 0.64 \quad (1)$$

$$0.48 < R5a/f < 0.68 \quad (2)$$

$$0.25 < n3 - n2 \quad (3)$$

$$1.8 < (n3 + n6 + n8 + n9)/4 \quad (4)$$

$$(\nu5 + \nu7)/2 < 30 \quad (5)$$

where $R4b$ and $R5a$ are the radii of curvature of the rear and front surfaces of the fourth and fifth lenses G4 and G5, respectively, f is the focal length of the entire system, $n2, n3, n6, n8$ and $n9$ are the refractive indices of the glasses of the second, third, sixth, eighth and ninth lenses G2, G3, G6, G8 and G9 respectively, and $\nu6$ and $\nu7$ are the Abbe numbers of the glasses of the fifth and seventh lenses G5 and G7 respectively.

The inequalities of condition (1) and (2) set forth proper ranges for the refractive powers of those concave surfaces which are nearest to the stop S on either side thereof, namely, the rear surface of the fourth lens G4 and the front surface of the fifth lens G5 in order to secure the regular back focal distance, while permitting good correction of sagittal flare and field curvature from the intermediate to the marginal zone of the image frame when the relative aperture is increased.

When the refractive power of these concave surfaces are too weak beyond the upper limit of the condition (1) or (2), the back focal distance will become insufficient, and, though the sagittal flare is lessened, the Petzval sum will increase so that the curvature of field is increased. Conversely, when they are too strong beyond the lower limit of the condition (1) or (2), the sagittal flare is increased largely, although the sufficiently long back focal distance is secured and the curvature of field is reduced.

The inequalities of conditions (3) and (4) in view of the conditions (1) and (2) set forth proper ranges for the refractive indices of some of the lenses in order to reduce the Petzval sum and to well correct spherical aberration. When the difference between the refractive indices of the glasses of the second and third lenses G2 and G3 falls outside the inequality of condition (3), the Petzval sum is increased, and the sagittal image surface of the field curvature is very undercorrected. Further, large spherical aberration, particularly for the g-line, is produced.

The inequality of condition (4) sets forth a limit for the mean value of the refractive indices of the glasses of the four main ones of the positive lenses constituting the lens system, and cooperates with the condition (3) to reduce the Petzval sum. When this limit is violated, the Petzval sum is increased objectionably.

The inequality of condition (5) sets forth a limit for the mean value of the Abbe numbers of the glasses of those negative lenses which lie on the image side of the stop, or the fifth and seventh lenses G5 and G7 in order to well correct chromatic aberrations over the entire area of the image frame. When this limit is violated, the longitudinal and lateral chromatic aberrations both are under-corrected objectionably.

With a view to the great increase of the relative aperture in the invention, for good correction of not only the primary but also higher-order various aberrations, it is better to make use of at least one aspherical surface on each of the object and image sides of the stop.

The one of the two aspherical surfaces which lies on the object side of the stop should be figured so that the positive power increases toward the margin of the lens. This enables good correction of both distortion due to the asymmetry of the lens system about the stop and sagittal flare to be achieved. Another aspherical surface which lies on the image side of the stop should be figured so that the negative power increases toward the margin of the lens. This enables the curvatures of the two concave surfaces adjacent to the stop on either side thereof to be weakened to reduce the amount of produced sagittal flare.

While, in the numerical examples to be later, the first lens unit G1 is shown as constructed with either one or two lens elements, the number of lens elements may be increased to three or more.

Also, while the doublets on the object and image sides of the stop S are shown to be in cemented contact, they may be in broken contact. Even in this case, the objects of the invention will be accomplished.

Focusing is preferrably performed by moving the entire lens system on the point of view of the aberrational problem, but may be otherwise performed by moving either the front or the rear half of the lens system with respect to the stop, or moving both halves at different speeds from each other.

Three examples of specific lenses of the invention can be constructed in accordance with the numerical data given in the following tables for the radii of curvature, R, the axial thicknesses or air separations, D, and the refractive indices, N, and Abbe numbers, $\nu$, of the glasses of the lens elements with the subscripts numbered from the front to rear.

The equation for the aspherical surface in the coordinates with the X-axis in the optical axis, and the H axis in the direction perpendicular to the optical axis, the direction in which light advances being taken as positive, is:

$$X = \frac{(1/R)H^2}{1 + \sqrt{1 - (H/R)^2}} + AH^2 + BH^4 + CH^6 + DH^8 + EH^{10}$$

where R is the radius of curvature of the osculating spherical surface, and A, B, C, D and E are the aspherical coefficients.

| Numerical Example 1 |
|---|
| F = 100    FNO = 1:1.0    $2\omega$ = 45.2° |

| | | |
|---|---|---|
| R1 = 209.22 | D1 = 12.31 | N1 = 1.81600    $\nu1$ = 46.6 |
| R2 = −4382.55 | D2 = 0.29 | |
| R3 = Aspherical | D3 = 5.77 | N2 = 1.51742    $\nu2$ = 52.4 |

-continued

Numerical Example 1
F = 100  FNO = 1:1.0  2ω = 45.2°

| | | | |
|---|---|---|---|
| R4 = 71.72 | D4 = 16.73 | N3 = 1.81600 | ν3 = 46.6 |
| R5 = 298.96 | D5 = 2.28 | | |
| R6 = 2797.06 | D6 = 5.10 | N4 = 1.51742 | ν4 = 52.4 |
| R7 = 51.87 | D7 = 17.88 | | |
| R8 = Stop | D8 = 17.88 | | |
| R9 = −51.11 | D9 = 3.47 | N5 = 1.80518 | ν5 = 25.4 |
| R10 = 125.00 | D10 = 25.96 | N6 = 1.81600 | ν6 = 46.6 |
| R11 = −71.44 | D11 = 3.94 | | |
| R12 = −59.32 | D12 = 4.81 | N7 = 1.80518 | ν7 = 25.4 |
| R13 = Aspherical | D13 = 0.29 | | |
| R14 = −428.25 | D14 = 14.42 | N8 = 1.88300 | ν8 = 40.8 |
| R15 = −93.85 | D15 = 0.19 | | |
| R16 = 986.86 | D16 = 10.77 | N9 = 1.88300 | ν9 = 40.8 |
| R17 = −190.57 | D17 = 0.96 | | |
| R18 = 142.39 | D18 = 8.94 | N10 = 1.55963 | ν10 = 61.2 |
| R19 = 961.53 | | | |

For the 3rd Surface (R3)
R = ∞
A = 4.553 × 10$^{-3}$, B = 9.829 × 10$^{-8}$
C = 5.007 × 10$^{-11}$, D = −1.916 × 10$^{-14}$
E = 5.896 × 10$^{-18}$ For the 13th Surface (R13)
R = ∞
A = −4.326 × 10$^{-3}$, B = −2.413 × 10$^{-8}$
C = 6.084 × 10$^{-11}$, D = −2.496 × 10$^{-14}$
E = 4.423 × 10$^{-18}$

Numerical Example 2
F = 100  FNO = 1:1.0  2ω = 45.2°

| | | | |
|---|---|---|---|
| R1 = 265.49 | D1 = 9.81 | N1 = 1.60311 | ν1 = 60.7 |
| R2 = 1254.83 | D2 = 0.19 | | |
| R3 = 168.21 | D3 = 9.42 | N2 = 1.69680 | ν2 = 55.5 |
| R4 = 522.76 | D4 = 0.29 | | |
| R5 = Aspherical | D5 = 7.69 | N3 = 1.51742 | ν3 = 52.4 |
| R6 = 78.02 | D6 = 15.00 | N4 = 1.88300 | ν4 = 40.8 |
| R7 = 280.28 | D7 = 2.50 | | |
| R8 = 1093.50 | D8 = 5.19 | N5 = 1.51742 | ν5 = 52.4 |
| R9 = 51.26 | D9 = 17.88 | | |
| R10 = Stop | D10 = 17.88 | | |
| R11 = −48.88 | D11 = 3.86 | N6 = 1.84666 | ν6 = 23.9 |
| R12 = 148.01 | D12 = 25.50 | N7 = 1.88300 | ν7 = 40.8 |
| R13 = −69.60 | D13 = 3.15 | | |
| R14 = −60.14 | D14 = 4.81 | N8 = 1.80518 | ν8 = 25.4 |
| R15 = Aspherical | D15 = 0.29 | | |
| R16 = −401.91 | D16 = 13.08 | N9 = 1.88300 | ν9 = 40.8 |
| R17 = −99.27 | D17 = 0.19 | | |
| R18 = 3746.07 | D18 = 12.69 | N10 = 1.88300 | ν10 = 40.8 |
| R19 = −139.62 | D19 = 0.96 | | |
| R20 = 142.39 | D20 = 8.85 | N11 = 1.55963 | ν11 = 61.2 |
| R21 = 961.53 | | | |

For the 5th Surface (R5)
R = ∞
A = 3.826 × 10$^{-3}$, B = 6.521 × 10$^{-8}$
C = 4.881 × 10$^{-11}$, D = −1.684 × 10$^{-14}$
E = 4.549 × 10$^{-18}$ For the 15th Surface (R15)
R = ∞
A = −3.846 × 10$^{-3}$, B = 3.361 × 10$^{-8}$
C = 8.434 × 10$^{-11}$, D = −3.297 × 10$^{-14}$
E = 5.350 × 10$^{-18}$

Numerical Example 3
F = 100  FNO = 1:1.0  2ω = 45.4°

| | | | |
|---|---|---|---|
| R1 = 202.86 | D1 = 12.38 | N1 = 1.60311 | ν1 = 60.7 |
| R2 = 777.09 | D2 = 0.19 | | |
| R3 = 167.94 | D3 = 12.38 | N2 = 1.60311 | ν2 = 60.7 |
| R4 = 513.29 | D4 = 0.19 | | |
| R5 = Aspherical | D5 = 5.80 | N3 = 1.49831 | ν3 = 65.0 |
| R6 = 60.33 | D6 = 16.83 | N4 = 1.77250 | ν4 = 49.6 |
| R7 = 223.73 | D7 = 1.93 | | |
| R8 = 345.74 | D8 = 5.61 | N5 = 1.53172 | ν5 = 48.9 |
| R9 = 46.63 | D9 = 26.11 | | |

Numerical Example 3 (continued)
F = 100  FNO = 1:1.0  2ω = 45.4°

| | | | |
|---|---|---|---|
| R10 = Stop | D10 = 18.96 | | |
| R11 = −44.54 | D11 = 4.84 | N6 = 1.84666 | ν6 = 23.9 |
| R12 = 513.02 | D12 = 21.28 | N7 = 1.88300 | ν7 = 40.8 |
| R13 = −59.36 | D13 = 4.84 | N8 = 1.68893 | ν8 = 31.1 |
| R14 = Aspherical | D14 = 0.29 | | |
| R15 = −767.37 | D15 = 12.57 | N9 = 1.80400 | ν9 = 46.6 |
| R16 = −111.18 | D16 = 0.29 | | |
| R17 = 2131.69 | D17 = 14.89 | N10 = 1.77250 | ν10 = 49.6 |
| R18 = −112.98 | D18 = 0.97 | | |
| R19 = 134.61 | D19 = 8.41 | N11 = 1.60311 | ν11 = 60.7 |
| R20 = 967.11 | | | |

For the 5th Surface (R5)
R = ∞
A = 3.611 × 10$^{-3}$, B = 4.878 × 10$^{-8}$
C = 3.087 × 10$^{-12}$, D = 2.204 × 10$^{-15}$
E = 0

For the 14th Surface (R14)
R = ∞
A = −2.901 × 10$^{-3}$, B = 1.892 × 10$^{-7}$
C = 3.507 × 10$^{-11}$, D = −3.178 × 10$^{-15}$
E = 0

According to the present invention, by setting forth the above-stated rules of design for the constituent lenses, a Gauss type lens of higher relative aperture than was heretofore possible, or 1:1.0 in F-number with the sufficient increase of the back focal distance at an angular field of view of about 45 degrees, while still maintaining good correction of aberrations to be achieved over the entire area of image format can be realized.

What is claimed is:

1. A photographic lens comprising, from front to rear, a first lens unit including at least one positive lens; a negative meniscus-shaped second lens convex toward the front, a positive third lens with its front surface of strong refractive power convex toward the front, a negative fourth lens with its rear surface of strong refractive power concave toward the rear, a negative fifth lens with its front surface of strong refractive power concave toward the front, a positive sixth lens with its rear surface of strong refractive power convex toward the rear, a negative meniscus-shaped seventh lens convex toward the rear, a positive meniscus-shaped eighth lens convex toward the rear, a positive ninth lens and a positive meniscus-shaped tenth lens convex toward the front.

2. A photographic lens according to claim 1, wherein said second and said third lenses are cemented together, and said fifth and said sixth lenses are cemented together.

3. A photographic lens according to claim 1, wherein said first lens unit consists of one positive lens.

4. A photographic lens according to claim 1, wherein said first lens unit consists of two positive lenses.

5. A photographic lens according to claim 1, satisfying the following conditions:

0.44 < R4b/f < 0.64

0.48 < R5a/f < 0.68

0.25 < n3 − n2

1.8 < (n3 + n6 + n8 + n9)/4

(ν5 + ν7)/2 < 30 wherein R4b and R5a are the radii of curvature of the rear surface of said fourth lens and the front surface of said fifth lens respectively, f is the focal length of the entire lens system, n2, n3, n6, n8 and n9 are the refractive indices of the glasses of the second, third, sixth, eighth and ninth lenses respectively, and ν5 and ν7 are the Abbe numbers of the glasses of the fifth and seventh lenses.

6. A photographic lens according to claim 1, wherein the air spaces between said third and said fourth lenses and between said sixth and said seventh lenses each are of the positive lens form.

7. A photographic lens comprising:
 a front lens unit including at least one positive lens;
 a first cemented unit arranged on the image side of said front lens unit and including a negative meniscus lens of forward convexity and a positive lens cemented together in this order from the front;
 a first negative lens arranged on the image side of said first cemented unit and having a concave surface facing toward the rear,
 a second cemented unit arranged on the image side of said first negative lens and including a bi-concave lens and a bi-convex lens cemented together in this order from the front;
 a meniscus second negative lens arranged on the image side of said second cemented unit and having a convex surface facing toward the rear; and
 a rear lens unit arranged on the image side of said meniscus second negative lens and including a plurality of positive lenses.

8. A photographic lens according to claim 7, wherein said front lens unit consists of one positive lens with its front surface of strong curvature convex toward the front.

9. A photographic lens according to claim 7, wherein said front lens unit consists of two positive lenses with their front surfaces of strong curvature convex toward the front.

10. A photographic lens according to claim 7, wherein said rear lens unit consists of two positive lenses with their rear surfaces of strong curvature convex toward the rear and one positive lens with its front surface of strong curvature convex toward the front.

* * * * *

UNITED STATES PATENT AND TRADEMARK OFFICE
CERTIFICATE OF CORRECTION

PATENT NO. : 4,717,245
DATED : January 5, 1988
INVENTOR(S) : SADATOSHI TAKAHASHI It is certified that error appears in the above-identified patent and that said Letters Patent is hereby corrected as shown below:

COLUMN 1

Line 44, "Summary of the Invention" should read --SUMMARY OF THE INVENTION--.
Line 51, "perture." should read --aperture.--.

COLUMN 2

Line 21, "herein as" should read --as herein--.

COLUMN 3

Line 22, "$0.25 < n_3 - n_a$    (3)" should read --$0.25 < n_3 - n_2$    (3)--.
Line 33, "$\nu_6$" should read --$\nu_5$--.

COLUMN 4

Line 29, "to be" should read --to be described--.
Line 37, "preferrably" should read --preferably--.

Signed and Sealed this

Seventh Day of February, 1989

Attest:

DONALD J. QUIGG

Attesting Officer   Commissioner of Patents and Trademarks